US010091632B1

(12) United States Patent
Smith et al.

(10) Patent No.: US 10,091,632 B1
(45) Date of Patent: Oct. 2, 2018

(54) BEDSIDE SPEAKER USING PERSONAL AREA NETWORKING

(71) Applicant: PDI Communications Systems, Inc., Springboro, OH (US)

(72) Inventors: Jonathan T. Smith, Washington Township, OH (US); Charles E. Lockhart, III, Springboro, OH (US)

(73) Assignee: PDI Communications Systems, Inc., Springboro, OH (US)

( * ) Notice: Subject to any disclaimer, the term of this patent is extended or adjusted under 35 U.S.C. 154(b) by 1182 days.

(21) Appl. No.: 13/693,882

(22) Filed: Dec. 4, 2012

(51) Int. Cl.
*H04W 88/02* (2009.01)
*H04W 4/80* (2018.01)
*H04W 4/00* (2018.01)

(52) U.S. Cl.
CPC ............. *H04W 4/80* (2018.02); *H04W 4/008* (2013.01)

(58) Field of Classification Search
CPC ...... H04W 84/20; H04W 88/02; G08C 17/02; G08C 17/00; G08C 2201/21; G08C 2201/92; G08C 2201/93
USPC ...................................... 455/41.2, 41.3, 66.1
See application file for complete search history.

(56) References Cited

U.S. PATENT DOCUMENTS

| | | | | |
|---|---|---|---|---|
| 2,927,203 | A | * | 3/1960 | Burke .................. 455/176.1 |
| D692,848 | S | * | 11/2013 | Poandl .................. D14/172 |
| 2012/0300962 | A1 | * | 11/2012 | Devoto .................. 381/300 |

OTHER PUBLICATIONS

1993 GE Space Saver Electronic Digital Clock Radio, Model 7-4612, User manual.*

* cited by examiner

*Primary Examiner* — Dong-Chang Shiue
(74) *Attorney, Agent, or Firm* — Wood Herron & Evans LLP

(57) ABSTRACT

A tabletop Bluetooth® receiving device including a speaker and Bluetooth® interface circuitry, which reproduces audio signals from selectable sources including an audio signal received from a Bluetooth® compliant transmitter connected via the Bluetooth® interface circuitry. A user interface associated with the Bluetooth® receiving device generates command signals in response to user input via one or more knobs and/or buttons, and the command signals may be transmitted via the Bluetooth® interface circuitry to thereby remotely control the Bluetooth® compliant transmitter.

12 Claims, 2 Drawing Sheets

BEDSIDE SPEAKER USING PERSONAL AREA NETWORKING

FIELD OF THE INVENTION

The present invention relates generally to a television sound distribution and control system, and to television audio output and control systems.

BACKGROUND OF THE INVENTION

In hospitality facilities, particularly patient care facilities, televisions are often integrated into the room in unique ways that are different from conventional consumer environments, using remote control and sound distribution systems that differ from conventional consumer environments in private homes.

For example, in a patient care facility, patients are often bedridden or otherwise unable or have limited ability to move, and as a result, remote control systems are necessary. Furthermore, patients often share rooms as a cost-saving and safety measure, and as a result, sound distribution from the television is often placed closer to the patient to reduce the ambient noise in the patient rooms utilizing a localized sound distribution device, such as a pillow speaker. Moreover, in patient care facilities, often the sound distribution system and remote control system can be integrated into one unit that performs both functions.

Furthermore, in some conventional personal area networking devices, such as Bluetooth® wireless headsets, the personal area networking device may receive an audio signal from and transmit command instructions to a transmitting device (e.g., a Bluetooth® transmitter) utilizing interface circuitry connected to a transmitter in compliance with a wireless communication protocol, to communicate with a compliant transmitter/transmitting source (e.g., a device configured to transmit and receive data using the Bluetooth® wireless communication protocol). However, these conventional systems generally comprise an individualized sound reproduction device, such as a headset, where one or more speakers of the device are positioned proximate a user's ear, and a front and back surface of the one or more speakers are generally unenclosed.

A Bluetooth® communication protocol generally defines a command format through which Bluetooth® devices compliant with the communication protocol may interface. For example, the Bluetooth® Advanced Audio Profile (A2DP) generally provides a command format through which stereo and/or mono audio signals may be communicated from a Bluetooth® transmitting device to a Bluetooth® reproduction device. Similarly, the Bluetooth® Audio Video Remote Control Profile (AVRCP) generally provides a command format through which commands for remotely controlling a Bluetooth® transmitting device. While a Bluetooth® communication protocol may be occasionally revised, the commands comprising the command format generally remain unchanged from revision to revision. For example, the Bluetooth® A2DP 2.0 profile and the Bluetooth® AVRCP Revision V13 (approved Apr. 16, 2007) and/or V14r00 (approved Jun. 26, 2008) reflect updated versions of each profile where many commands remain unchanged. The Bluetooth® A2DP profile and the Bluetooth® AVCRP profile are incorporated in their entirety herein.

However, a significant need continues to exist for improved localized sound distribution and control systems.

SUMMARY OF THE INVENTION

The present invention is generally directed to a tabletop localized sound distribution and control system. The localized sound distribution and control system comprises a tabletop Bluetooth® receiving device for reproducing sound based on an audio signal received from a Bluetooth® compliant transmitter. The tabletop Bluetooth® receiving device includes a housing having a bottom surface and support feet on the bottom surface for placement on a horizontal surface. In some embodiments, the receiving device occupies a relatively small device footprint such that the device may rest upon a bed-side table in a patient care facility. The device includes a speaker associated with the housing, and the speaker reproduces sound based on an input audio signal. The speaker includes a radiating front side and a rear side, where the housing encloses the rear side as an acoustic cabinet. Hence, in some embodiments, the radiating front side may produce sound in a localized manner, while the housing serves as an acoustic cabinet for the rear side of the speaker, thereby serving to direct the reproduced sound and facilitate amplification of the reproduced sound. The device further includes Bluetooth® interface circuitry associated with the housing. The Bluetooth® interface circuitry is configured to wirelessly connect with a Bluetooth® compliant transmitter to receive an audio signal from the transmitter and transmit command signals compliant with a Bluetooth® AVRCP profile to the transmitter. The device further includes a user interface integrated into the housing, where the user interface controls the generation of the command signals in response to one or more user interactions with the user interface.

The invention is particularly useful in patient care environments where patient rooms are shared by more than one patient, where the speaker of the device may provide localized sound for a television in the patient room. The invention is also useful in personal homes where a user of the television may desire to localize the television sound to prevent disturbance or distraction to other people in the private home.

Various refinements of the features noted in relation to the above mentioned aspects of the present invention. Further features may also be incorporated in the above-mentioned aspects of the present invention as well. These refinements and additional features may exist individually or in any combination. For instance, various features discussed below in relation to any of the exemplary embodiments of the present invention may be incorporated into any of the aspects of the present invention alone or in any combination.

BRIEF DESCRIPTION OF THE DRAWINGS

The accompanying figures, which are incorporated herein and constitute a part of this specification, illustrate exemplary embodiments of the invention and, together with a general description of aspects of the invention given above, and the detailed description of various exemplary embodiments given below, serve to explain various principles of the invention.

DETAILED DESCRIPTION OF THE INVENTION

A sound distribution and control system for providing localized sound in accordance with the present invention consists of circuitry that may be integrated into one or more circuit boards integrated into one or more housings. The one or more circuit boards may consist of one or more general or special purpose microcontrollers configured to perform various functions.

Figure 1:
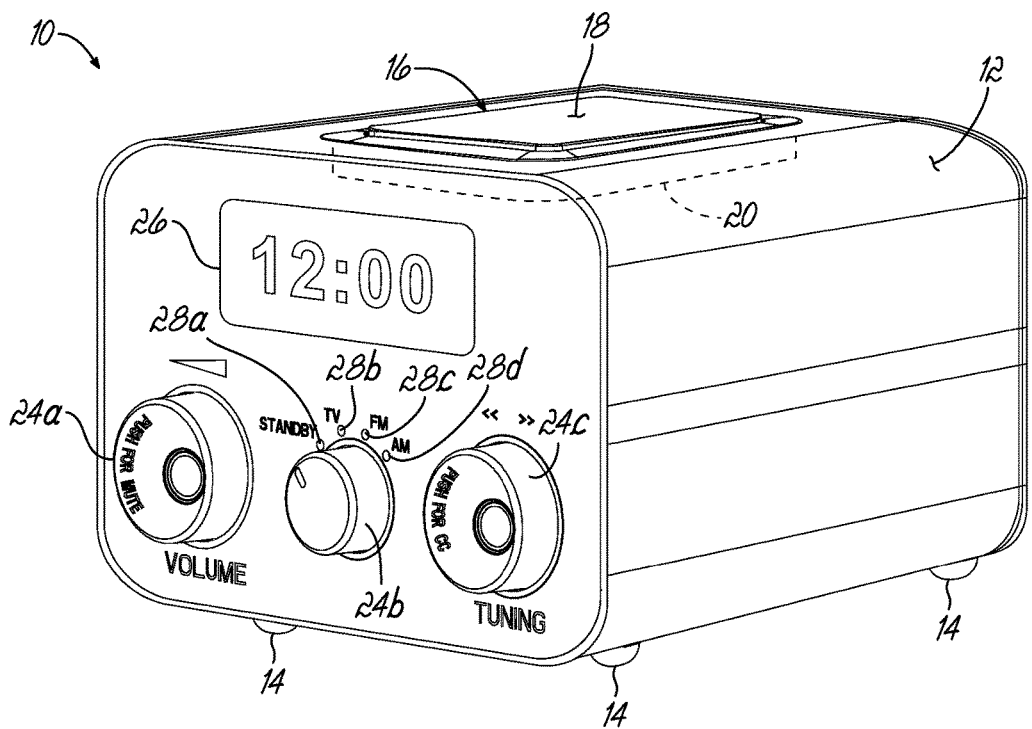
FIG. 1 is front elevated view of a tabletop Bluetooth® receiving device consistent with some embodiments of the invention.

Referring to the drawings, FIG. 1 illustrates an exemplary embodiment of a tabletop Bluetooth® receiving device 10 consistent with some embodiments of the invention. As shown, the device 10 includes a housing 12 having a bottom surface and support feet 14 on the bottom surface such that the device 10 may be placed upon a horizontal surface, including for example, a horizontal surface associated with a table, a stand, a desk, and/or other such items. Furthermore, the device 10 includes a speaker 16 which may be utilized to reproduce sound based on an audio signal input to the speaker. The speaker includes a radiating front side 18 and a rear side 20, where the rear side 20 is enclosed by the housing 12, such that the housing is an acoustic cabinet for the speaker 16. In addition, the device 10 includes a plurality of rotatable and/or depressable knobs 24a-c and an output display 26. As such, a user of the device 10 may provide user input to the device 10 via the knobs 24a-c, and the device 10 may provide output to the user via the output display 26 and/or the speaker 16.

A first knob 24a may be configured to facilitate the user adjusting the output volume of the device 10 and/or an audio source connected to the device 10 over a Bluetooth® connection by rotating the knob 24a. Furthermore, the first knob 24a may be configured to alternate between mute/unmute of the output volume of the device 10 when the first knob 24a is depressed.

A second knob 24b may be configured to facilitate the user selecting an input audio signal source for sound reproduction. As shown in FIG. 1, the second knob 24b may include four input audio signal source positions 28a-d, where a particular input audio signal source may be selected by a user by rotating the second knob 24b to a position corresponding audio signal source position 28a-d. A first input audio signal source position 28a may be a standby position, where the standby audio signal source generally refers to an off position for the device 10, such that no sound will be reproduced by the device 10 when the second knob 24b is rotated to the first position 28a. A second input audio signal source position 28b may be a television position, where the television audio signal source selects as an input audio signal for reproduction by the device 10 an audio signal received from a television connected to the device 10 via a Bluetooth® connection. A third input audio signal source position 28c may be a FM radio position, such that an audio signal from FM radio receiving circuitry may be reproduced by the device 10. A fourth input audio signal source position 28d may be an AM radio position, such that an audio signal from AM radio receiving circuitry may be reproduced by the device 10.

A third knob 24c may be configured to facilitate a user adjusting a channel (i.e., tuning) the device 10 and/or an audio source connected to the device 10 over a Bluetooth® connection by rotating the third knob 24c. Furthermore, the third knob 24c may be configured to alternate between activate/deactivate of closed captioning (CC) on a television connected to the device 10 via a Bluetooth® connection by depressing the third knob 24c.

Furthermore, output display 26 may provide output responsive to user interaction with one or more knobs 24a-c. For example, if a user of the device 10 rotates the first knob 24a to adjust the reproduction volume of the device 10, the output display may present the user with display elements corresponding to the volume level and the adjustments made thereto via the first knob 24a.

As shown in FIG. 1, the device 10 may be sized to rest on a bedside table or other horizontal surface, including, for example in a patient care facility. As such, in some embodiments, the device 10 may be substantially parallelepiped in shape and the dimensions of the housing 12 may include a height of about 1 to 12 inches, a depth of about 1 to 12 inches, and a width of about 1 to 12 inches, such that the device is easily movable and may rest on for example on a tabletop. In some embodiments, the dimensions of the housing 12 may be a height of approximately 4.7 inches, a depth of approximately 5.5 inches, and a width of approximately 7.1 inches.

Figure 2:
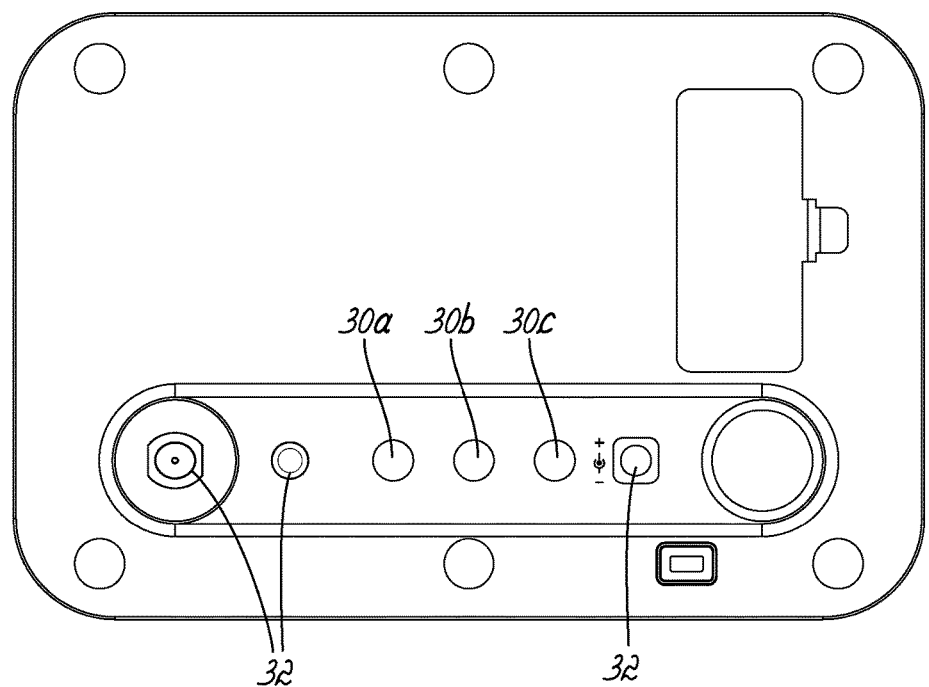
FIG. 2 is a rear view of the device of FIG. 1.

FIG. 2 provides a rear view of the tabletop receiving device 10 of FIG. 1 consistent with some embodiments. As shown in FIG. 2, the device 10 may include a plurality of input buttons 30a, 30b, 30c. Furthermore, the device 10 includes one or more ports 32, where the ports may be configured to accept a power adapter, connect an external antenna to the device 10 and/or other such functions. A first button 30a of the plurality of buttons 30 may be configured to initiate a Bluetooth® pairing interface between the device 10 and a Bluetooth® compatible transmitter, such as a television having a Bluetooth® interface.

Figure 3:
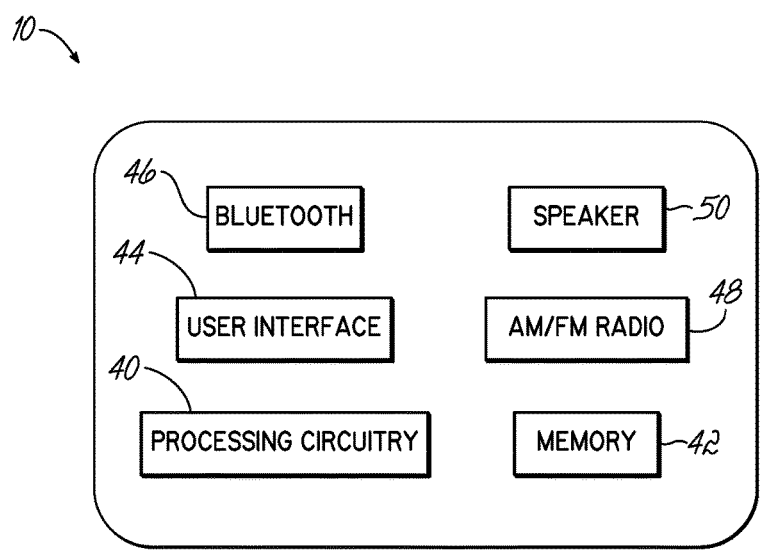
FIG. 3 is a schematic illustration of the device of FIG. 1.

FIG. 3 is a schematic diagram of the tabletop Bluetooth® receiving device 10 of FIG. 1. As shown in FIG. 3, the device 10 includes processing circuitry 40, memory 42, a user interface 44, a Bluetooth® interface 46, AM/FM receiving circuitry 48, and speaker circuitry 50. As discussed above, the device 10 may include one or more user input features, such as the pressable and rotatable knobs 24a-c of FIG. 1, the buttons 30a-c of FIG. 2. In addition, the device 10 may include a display, such as the output display 26 of FIG. 1. User interface 44 may be connected to the knobs 24a-c of FIG. 1, the buttons 30a-c of FIG. 2, and the output display 26 of FIG. 1. In these embodiments, the user interface 44 may be configured to generate one or more Bluetooth® AVRCP profile compliant command signals in response to a user of the device 10 interfacing with the device via the knobs 24a-c and/or the buttons 30a-c.

The processing circuitry 40 may comprise one or more special purpose and/or general purpose microcontrollers. In some embodiments, the processing circuitry 40 may be in communication with the memory 42, user interface 44, Bluetooth® interface 46, AM/FM receiving circuitry 48, and/or speaker 50. As such, the processing circuitry 40 may perform one or more steps consistent with embodiments of the invention utilizing components in communication with the processing circuitry 40. For example, an audio signal may be received from a Bluetooth® transmitter connected to the device 10 utilizing the Bluetooth® interface 46, and processing circuitry 40 may receive the audio signal from the Bluetooth® interface 46 and input the audio signal to the speaker 50, such that the audio signal may be reproduced by the device 10.

Similarly, the device 10 may receive one or more inputs from a user interfacing with one or more knobs 24 and/or buttons 30 connected to the user interface 44, and the user interface may generate input data based on the user interaction. In this example, the processing circuitry 40 may receive input data from the user interface 44 based on an interaction from a user via knobs 24 and/or buttons 30, and the processing circuitry may generate a Bluetooth® AVRCP profile compliant command signal and transmit the generated signal to a connected Bluetooth® compliant transmitter utilizing the Bluetooth® interface 46. In addition, in response to receiving user input via knobs 24 and/or buttons 30, the user interface may generate input data, the processing circuitry may receive the input data and perform one or more operations in response to the input data. For example, the processing circuitry may output one or more display elements utilizing the output display 26, such that the user may be notified of the one or more operations performed by the user interface and/or processing circuitry.

Figure 4:
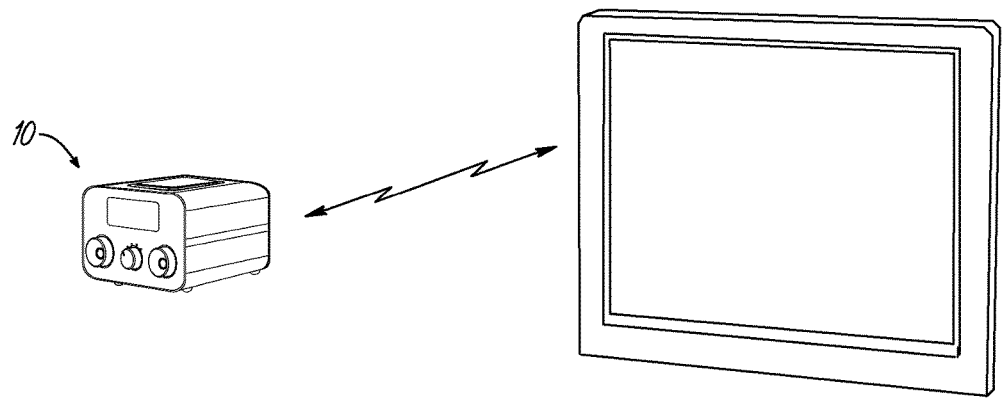
FIG. 4 is an exemplary embodiment of the device of FIG. 1 interfacing via a Bluetooth® connection with a Bluetooth® compliant transmitter; and It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

FIG. 4 is a diagrammatic illustration of a tabletop Bluetooth® receiving device 10 consistent with embodiments of the invention in communication with a Bluetooth® compliant television 50 via a Bluetooth® connection 52. As such, in some embodiments audio from the television 50 may be transmitted over the Bluetooth® connection 52 to the device, and the audio may be reproduced on the device 10 in a localized manner. Furthermore, a user may remotely control one or more functions of the television 50 utilizing the knobs 24, buttons 30, and/or user interface of the device 10. In some embodiments, in response to user input via a knob 24 and/or a button 30, a Bluetooth® compliant command signal may be generated by the processing circuitry 40 and/or user interface 44, and the command signal may be transmitted via the Bluetooth® connection 52 to the television 50, where the television 50 may be configured to perform one or more operations in response to receiving the command signal from the device 10.

With reference to FIGS. 1-4, in a first exemplary embodiment, a first knob 24a of the device 10 may be configured to adjust a volume associated with a television 50 connected to the device over a Bluetooth® connection 52. In this exemplary embodiment, in response to a user rotating the first knob 24a clockwise, the processing circuitry 40 and/or user interface 44 may generate a command signal compliant with the Bluetooth® AVRCP profile for increasing a volume level of the connected television 50. Similarly, in response to a user rotating the first knob counter-clockwise, the processing circuitry 40 and/or user interface 44 may generate a command signal compliant with the Bluetooth® AVRCP profile for decreasing a volume level of the connected television 50. In addition, in response to a user depressing the first knob 24a, the processing circuitry 40 and/or user interface 44 may generate a command signal compliant with the Bluetooth® AVRCP profile for toggling the connected television between a muted and unmated state.

In a second exemplary aspect of some embodiments, a second knob 24b of the device 10 may be configured to adjust an input audio source for reproduction by the device 10. For example, the second knob 24b may include a position to which the knob 24b may be rotated which corresponds to a particular input audio source. In response to the second knob 24b being rotated to a first position 28a, the processing circuitry 40 and/or user interface 44 may generate a Bluetooth® AVRCP compliant command signal instructing the connected television 50 to switch to a power standby mode. In response to the second knob 24b being rotated to a second position 28b, the processing circuitry 40 and/or user interface 44 may generate a Bluetooth® AVRCP compliant command signal instructing the connected television 50 to power on. In response to the second knob 24b being rotated to a third position 28c, the processing circuitry 40 and/or user interface 44 may input an audio signal received from the AM receiving circuitry 48 for reproduction, and the processing circuitry 40 and/or user interface 44 may generate a Bluetooth® AVRCP compliant control signal indicating to the television that an AM radio source is being reproduced by the device 10. In response to the second knob being rotated to a fourth position 28d, the processing circuitry 40 and/or user interface 44 may input an audio signal received from the FM receiving circuitry 48 for reproduction, and the processing circuitry 40 and/or user interface 44 may generate a Bluetooth® AVRCP compliant control signal indicating to the connected television that an FM radio source is being reproduced by the device 10.

In a third exemplary aspect of some embodiments, a third knob 24c of the device 10 may be configured to change a channel of an audio source selected by the second knob 24b by rotating the third knob 24c. For example, in response to the third knob 24c being rotated clockwise, the processing circuitry 40 and/or user interface 44 may generate a Bluetooth® AVRCP compliant command signal indicating to the television to increase a channel relative to the currently tuned channel (e.g., change from channel 4 to channel 5). Similarly, in response to the third knob 24c being rotated counter-clockwise, the processing circuitry 40 and/or user interface may generate a Bluetooth® AVRCP compliant command signal indicating to the television to decrease a channel relative to the currently tuned channel (e.g., change from channel 5 to channel 4). In addition, in response to the third knob 24c being depressed, the processing circuitry 40 and/or user interface 44 may generate a command signal compliant with the Bluetooth® AVRCP profile for toggling closed captioning on the connected television.

After generating the command signal in response to a user interfacing with the knobs and/or buttons, the command signal may be transmitted from the device 10 to the television 50 over the Bluetooth® connection 52 utilizing the Bluetooth® interface 46. In response to receiving a command signal over the Bluetooth® connection 52, the connected television may perform one or more operations based on the received command signal to perform a desired function, including for example, increasing/decreasing a volume, changing a channel, muting/unmuting a volume, powering on, powering to a standby mode, toggling closed captioning, and/or other such functions.

In a fourth exemplary aspect of some embodiments, a first button 32a may be configured to initiate a pairing operation between the device 10 and a Bluetooth® compliant transmitter, including for example, the television 50 of FIG. 4. In response to the first button 32a being depressed, the processing circuitry 40 and/or user interface 44 may generate a Bluetooth® pairing request for transmission to Bluetooth® compatible devices using the Bluetooth® interface circuitry 46.

As such, embodiments of the invention provide a tabletop Bluetooth® receiving device which may locally reproduce audio received over a Bluetooth® connection from a Bluetooth® compliant transmitter. A speaker having a radiating front side and a rear side acoustically enclosed by a housing of the device may receive input audio and reproduce the audio for a user of the device. The device may include Bluetooth® interface circuitry associated with the housing and configured to wirelessly connect with the Bluetooth® compliant transmitter to thereby receive data from the transmitter and transmit data to the transmitter over the Bluetooth® connection. The device may include a user interface integrated into the housing and including knobs, buttons, and/or a display output, where the user interface controls the generation of Bluetooth® command signals which may be transmitted to the connected Bluetooth® compliant transmitter over the Bluetooth® connection to thereby remotely control the Bluetooth® compliant transmitter via the one or more user interface features (e.g., knobs, buttons, switches, touchscreen, and/or output display) configured on the device.

While the invention has been illustrated by a description of the various embodiments and the examples, and while these embodiments have been described in considerable detail, it is not the intention of the applicants to restrict or in any other way limit the scope of the appended claims to such detail. Additional advantages and modifications will readily appear to those skilled in the art. Thus, the invention in its broader aspects is therefore not limited to the specific details, representative apparatus and illustrative example shown and described. Accordingly, departures may be made from such details without departing from the spirit or scope of applicants' general inventive concept.

What is claimed is:

1. A tabletop Bluetooth® receiving device for reproducing sound based on an audio signal received from a Bluetooth® compliant transmitter, the device comprising:
   a housing having a bottom surface and planar support feet on the bottom surface for placement on a horizontal surface;
   a speaker associated with the housing and configured to reproduce sound based on an input audio signal, the speaker having a radiating front side and a rear side, the housing enclosing the rear side as an acoustic cabinet;
   Bluetooth® interface circuitry associated with the housing and configured to wirelessly connect with a Bluetooth® compliant transmitter to thereby receive an audio signal from the transmitter and to thereby transmit command signals compliant with an Audio Video Remote Control Profile (AVRCP) to the transmitter; and
   a user interface integrated into the housing controlling the generation of the command signals.

2. The tabletop Bluetooth® receiving device of claim 1, wherein the user interface includes a first knob for controlling a volume, a second knob for selecting an audio signal source, and a third knob for tuning an audio signal source.

3. The tabletop Bluetooth® receiving device of claim 2, wherein the user interface controls generation of a first command signal in response to the third knob being rotated clockwise and the user interface controls generation of a second command signal in response to the third knob being rotated counter-clockwise.

4. The tabletop Bluetooth® receiving device of claim 3, wherein the first command signal instructs the Bluetooth® compliant transmitter to tune a channel being reproduced by the Bluetooth® compliant transmitter to a higher channel.

5. The tabletop Bluetooth® receiving device of claim 3, wherein the second command signal instructs the Bluetooth® compliant transmitter to tune a channel being reproduced by the Bluetooth® compliant transmitter to a lower channel.

6. The tabletop Bluetooth® receiving device of claim 2, wherein the second knob is rotatable to select audio signal sources including a television position, an Amplitude Modulation (AM) radio position, and a Frequency Modulation (FM) radio position.

7. The tabletop Bluetooth® receiving device of claim 6, wherein the user interface controls generation of a command signal directing the transmitter to power on from a standby mode to an on mode in response to the second knob being rotated to the television position.

8. The tabletop Bluetooth® receiving device of claim 6, wherein the user interface controls generation of a command signal directing the transmitter to power down to a standby mode from an on mode in response to the second knob being rotated to the standby position, the AM radio position, or the FM radio position.

9. The tabletop Bluetooth® receiving device of claim 1, wherein the housing is substantially parallelepipedal.

10. The tabletop Bluetooth® receiving device of claim 7, wherein the housing comprises a height of approximately 4.7 inches, a depth of approximately 5.5 inches, and a width of approximately 7.1 inches.

11. The tabletop Bluetooth® receiving device of claim 1, further comprising processing circuitry associated with the housing and connected to the user interface, Bluetooth® interface circuitry, and the speaker, such that the processing circuitry receives an audio signal from the Bluetooth® interface and inputs the audio signal to the speaker, and such that the processing circuitry receives command signals from the user interface and inputs the command signals to the Bluetooth® interface circuitry for transmission by the Bluetooth® interface circuitry.

12. The tabletop Bluetooth® receiving device of claim 1, wherein the user interface includes at least one button, and wherein the user interface is configured to control generation of a Bluetooth® connection request command signal in response to the at least one button being pressed.

* * * * *